United States Patent [19]
Norton et al.

[11] 3,743,018
[45] July 3, 1973

[54] OIL RECOVERY PROCESS USING AN UNHYDROLYZED POLYACRYLAMIDE AND PARTIALLY HYDROLYZED POLYACRYLAMIDE MOBILITY CONTROL AGENT

[75] Inventors: Charles J. Norton; David O. Falk, both of Denver, Colo.

[73] Assignee: Marathon Oil Company, Findlay, Ohio

[22] Filed: July 19, 1971

[21] Appl. No.: 163,642

[52] U.S. Cl.............................. 166/275, 252/8.55 D
[51] Int. Cl.............................................. E21b 43/22
[58] Field of Search.................... 166/273, 274, 275, 166/305 R; 252/8.55 D

[56] References Cited
UNITED STATES PATENTS

| | | | |
|---|---|---|---|
| 2,827,964 | 3/1958 | Sandiford et al. | 166/275 |
| 3,039,529 | 6/1962 | McKennon | 166/275 |
| 3,343,601 | 9/1967 | Pye | 166/275 X |
| 3,476,186 | 11/1969 | Sarem | 166/275 X |
| 3,543,855 | 12/1970 | Blatz | 166/275 X |
| 3,634,305 | 1/1972 | Johnson et al. | 166/275 X |

*Primary Examiner*—Stephen J. Novosad
*Attorney*—Joseph C. Herring, Richard C. Willson, Jr. et al.

[57] ABSTRACT

A mixture of unhydrolyzed polyacrylamide together with partially hydrolyzed polyacrylamide is used for recovery of petroleum. The partially hydrolyzed material reduces permeability and the unhydrolyzed material maintains viscosity.

6 Claims, 5 Drawing Figures

A 50:50 BLEND OF UNHYDROLYZED POLYACRYLAMIDE (PA): DOW 700 PARTIALLY HYDROLYZED COMPARED TO DOW 700 ALONE.

3,743,018

OIL RECOVERY PROCESS USING AN UNHYDROLYZED POLYACRYLAMIDE AND PARTIALLY HYDROLYZED POLYACRYLAMIDE MOBILITY CONTROL AGENT

CROSS REFERENCE TO RELATED APPLICATIONS

The following cases relate to the same general field as that of the present invention: U. S. Pat. No. 3,507,331; U. S. Pat. No. 3,467,187; Ser. No. 74,336 filed Sept. 22, 1970, now U.S. Pat. No. 3,677,344; Ser. No. 76,140 filed Sept. 28, 1970; Ser. No. 67,726 filed Aug. 28, 1970, now U.S. Pat. No. 3,670,820; Ser. No. 79,591 filed Oct. 9, 1970, now U.S. Pat. No. 3,692,113; Ser. No. 85,064 filed Oct. 29, 1970, now U.S. Pat. No. 3,684,014; Ser. No. 126731 filed Mar. 22, 1971; Ser. No. 133060 filed Apr. 12, 1971; Ser. No. 140931 filed May 6, 1971; and Ser. No. 209,479, filed Nov. 26, 1971.

BACKGROUND OF THE INVENTION

1. Field of the Invention

The present invention relates primarily to wells classified in Class 166 of the United States Patent Office, and more particularly to production of earth fluid by driving fluid classified in Class 166 subclass 252.

2. Description of the Prior Art

Water flooding with mobility-reducing agents, e.g., high molecular weight partially hydrolyzed polyacrylamides, has been successfully used to recover increased amounts of oil in secondary recovery methods. U. S. Pat. No. 2,827,964, teaches secondary recovery of petroleum from subterranean formations using water-soluble partially hydrolyzed acrylamide polymer. U. S. Pat. application Ser. No. 76,140, filed Sept. 28, 1970, copending, teaches improved mobility control of petroleum recovery by injecting at least two slugs, one containing a permeability reduction agent, e.g., partially hydrolyzed, high molecular weight polyacrylamide, and the other slug containing a fluid viscosity increasing agent, e.g., a linear polysaccharide or other biopolymer. Also, U. S. Pat. application, Ser. No. 85,064 filed Oct. 29, 1970, now U.S. Pat. No. 3,684,014, copending, teaches aqueous slugs containing both polyelectrolyte, e.g., partially hydrolyzed high molecular weight polyacrylamide and nonelectrolyte, e.g., polyethylene oxide, wherein the polyelectrolyte reduces permeability and is gradually depleted as it moves through the formation while the nonelectrolyte increases viscosity and does not undergo such depletion.

U. S. Pat. No. 3,039,529 teaches that the use of unhydrolyzed polyacrylamide is a very expensive operation due to its high absorption characteristics when injected into oil bearing formations.

A design criterion for an optimum flooding process is to have the mobility of the displacing fluid about equal to or less than that of the combination of the formation fluids (hydrocarbon and interstitial water) within the reservoir. As stated above, this has been accomplished by injecting into the water flood a single agent to effect a reduction in mobility. Generally, this agent is a partially hydrolyzed, high molecular weight polyacrylamide.

SUMMARY OF THE INVENTION

This invention relates to a method of improving mobility control of a flooding process by injecting an aqueous solution of unhydrolyzed polyacrylamide and partially hydrolyzed polyacrylamide into the oil bearing formation. The result of the injection of this aqueous solution is a substantial increase in production of petroleum from subterranean formations.

Reciprocal mobility values which are calculated from continuous monitored pressure data at various injections obtained by transducer at the front, middle, and rear of the core are presented for examples 8 and 9. The reciprocal mobility values are calculated by means of the Darcy equation $$\text{reciprocal mobility} = KA(\Delta P)/q1$$

where $K$ is the permeability, $A$ the cross-sectional area in $C^2$, $\Delta P$ the pressure change in atmospheres, $q$ the throughput flow rate in $CM^2/sec$, and 1 is the length of the core.

Figure 4:
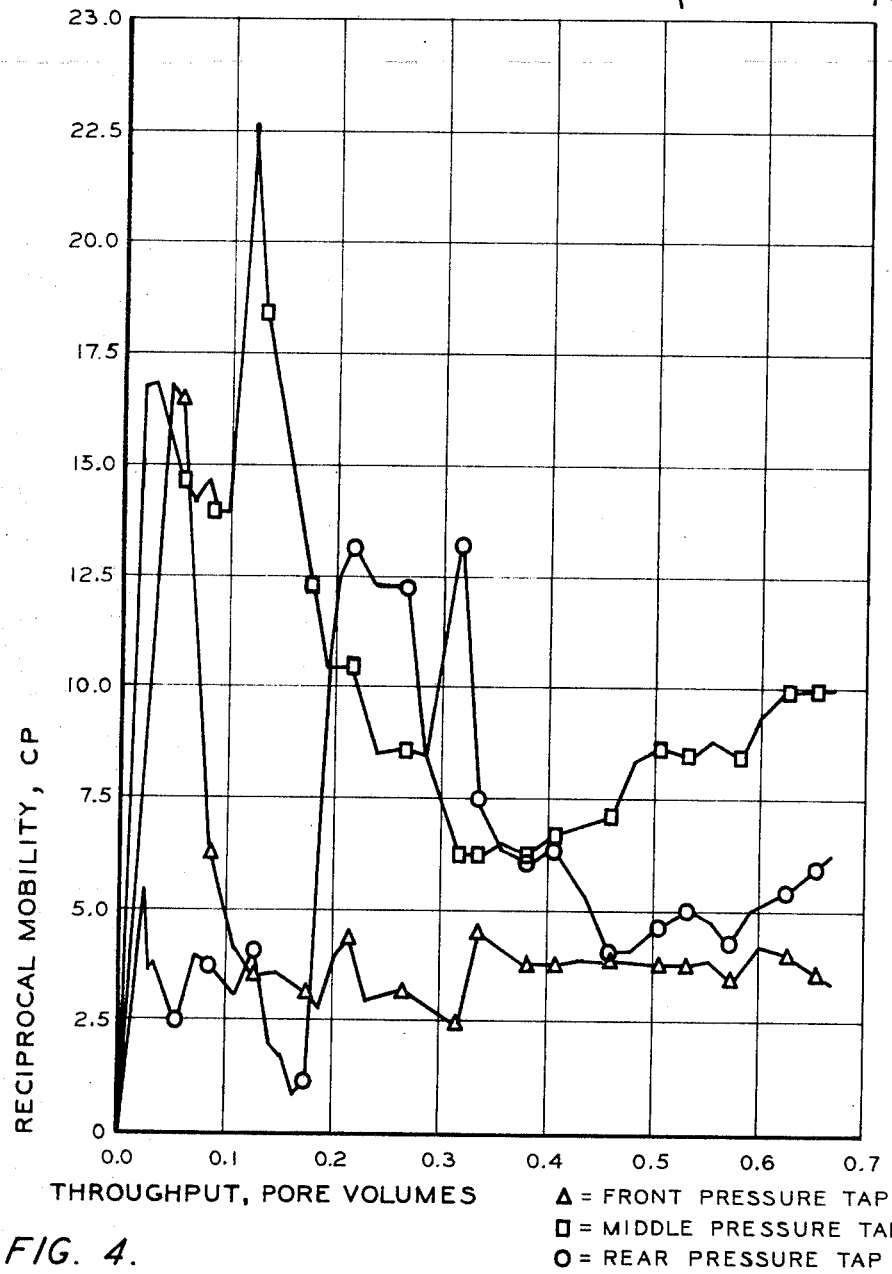
FIGS. 4 and 5 show improved reciprocal mobility control which results in improved oil recovery.
Figure 5:
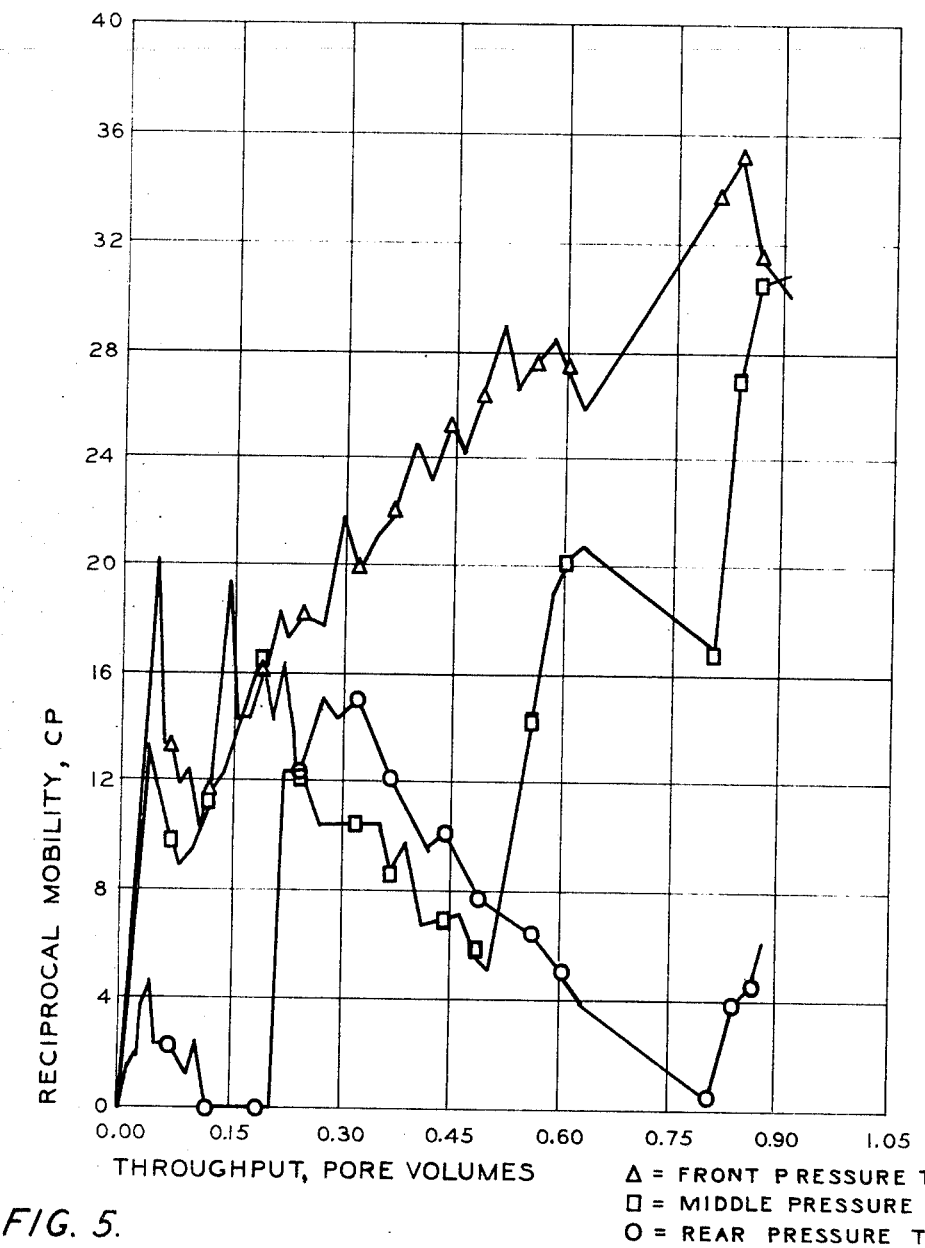

Comparison of reciprocal mobility data in FIGS. 4 and 5 indicates the improved oil recovery obtained with the synergistic mixture in example 9 is in large part due to the improved reciprocal mobilities sustained throughout the core flood during the supplemented recovery operation, first especially as measured at the front end of the core and later the middle of the core.

DESCRIPTION OF THE PREFERRED EMBODIMENTS

Starting Materials

By "unhydrolyzed polyacrylamide polymer" is meant herein high molecular weight polymers containing predominantly acrylamide monomer units.

By "partially hydrolyzed polyacrylamide" is meant herein polyacrylamide which has been hydrolyzed to 0.1 to 70 percent, more preferably to 1 to 45 percent, most preferably 5 to 30 percent, of theory.

Partially hydrolyzed polyacrylamide will preferably have molecular weights in the range of from about 0.1 to about $10 \times 10^6$, from 0.5 to $6 \times 10^6$, and most preferably from $1 \times 10^6$ to $5 \times 10^6$. Preferably the partially hydrolyzed polyacrylamide will be present in amounts of from about 0.001 to about 10.0, more preferably from 0.01 to about 1.0, and most preferably from 0.02 to about 0.2 weight percent based on the weight of the total solution. The unhydrolyzed polyacrylamide will preferably have molecular weights in the range of from about 0.1 to about $10 \times 10^6$, more preferably from 0.5 to about $6 \times 10^6$, and most preferably from $1 \times 10^6$ to about $5 \times 10^6$. Preferably, the unhydrolyzed polyacrylamide will be present in amounts from about 0.001 to about 10, more preferably from 0.01 to about 1.0, and most preferably from 0.02 to about 0.2 weight percent based on the total solution.

The solvent for the liquid solutions of the present invention were comprised of water, most preferably consist essentially of connate water, for example, Palestine line water, fresh water, or brackish water. It is preferable that the water contain less than about 300,000, more preferably less than about 10,000, and most preferably less than about 500 parts per million of dissolved solids. The resulting aqueous solution of unhydrolyzed polyacrylamide and partially hydrolyzed polyacrylamide will preferably have viscosity of from about 1.5 to about 1,000 cps, more preferably from about 5 to about 500 cps, and most preferably from 10 to about 100 cps.

While not necessary to the practice of the present invention, various other ingredients including among others, cellulose and surfactants, e.g., polyalkyl aryl sulfonate and other conventional displacement fluid additives may be added to the liquid polymer solutions.

Preparation of Liquid Systems

It will generally be preferable to merely co-mix the unhydrolyzed polyacrylamide and the partially hydrolyzed polyacrylamide and then add water while gently stirring to promote dispersion, suspension, and solution. Bubbling a small amount of non-oxygen gas, e.g., natural gas, may be used to effect mild stirring. The ingredients will preferably be mixed at a room temperature somewhat above room temperature, more preferably from 0°C to about 100°C, and most preferably from 20°C to about 50°C. If desired, a mixing operation can be employed in one or more full-type mixers or mixing tees so long as the proportions of the ingredients are properly measured and thoroughly mixed. Bacteriocides and anti-oxidants can be advantageously added to preserve the viscosity of the solution.

EXAMPLES 1 – 9

Examples 1 through 9 are run under identical conditions. The comparabilities of the examples employing various thickeners in supplemented recovery operations are established by the preliminary data on pore volumes (PV), porosities, permeabilities (md), initial oil and water saturations ($O_i$, $W_i$) residual oil and water saturations ($O_r$ and $W_r$) after preparation simulated water flood with a typical Henry field plant water, and similar efficiencies of water flood recovery (Eff). In all experiments a 0.03 PV slug of a petroleum sulfonate (FF-516) was pushed in the secondary flooding operation by up to about 1 PV of the particular thickened water. In each experiment the injection of thickened water was continued to the point at which no additional oil was recovered. The data are summarized in Table I, the last column of which lists the percent oil recovery based on residual oil remaining after the preliminary water flood.

Examples 1 and 2 establish the reproducibility of this precedure, which together with Experiment 3 give reference data for comparison with a typical partially hydrolyzed polyacrylamide polymer (Dow 700).

Figure 1:
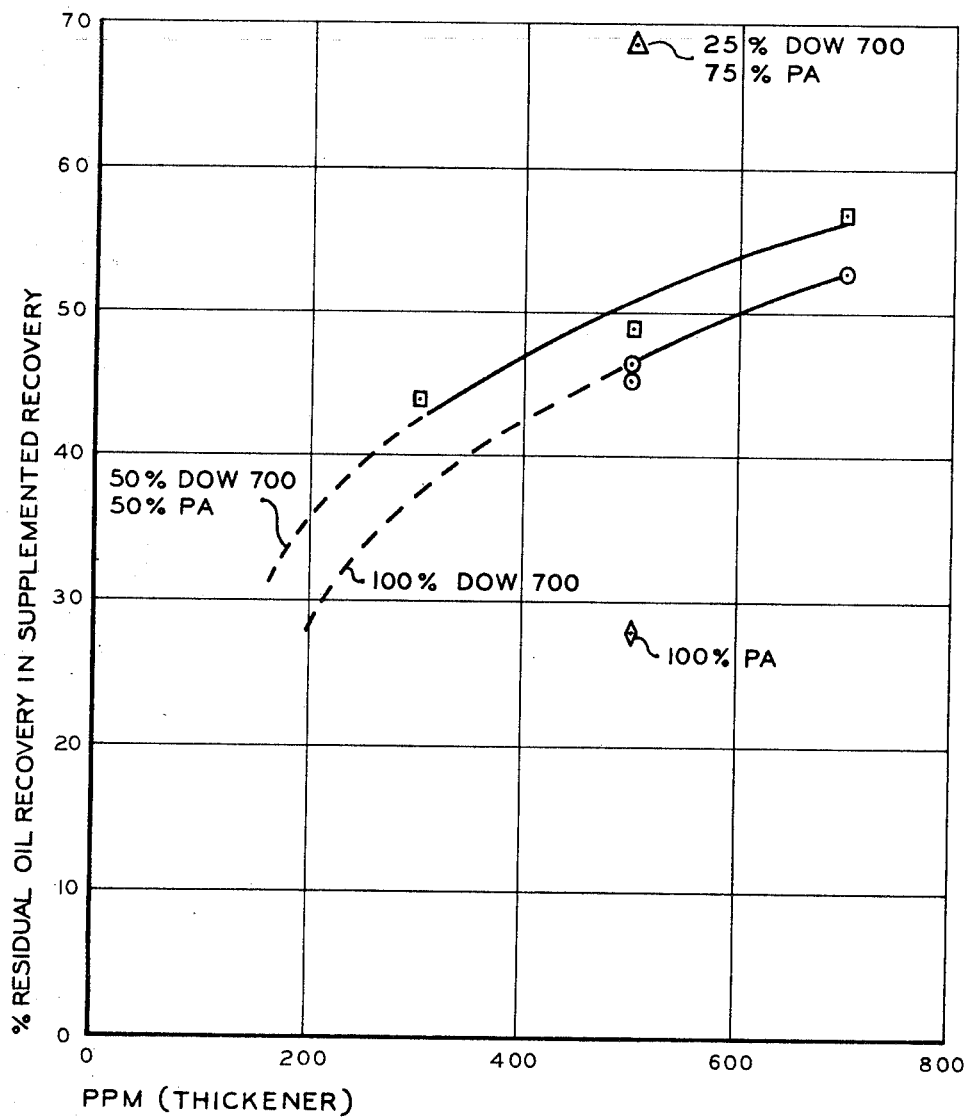
FIG. 1 shows the unexpected synergistic improvement that one obtains with a thickener formulation comprised of 50 percent unhydrolyzed polyacrylamide and 50 percent Dow 700 used to push a 0.03 pore volume of surfactant slug.
Figure 2:
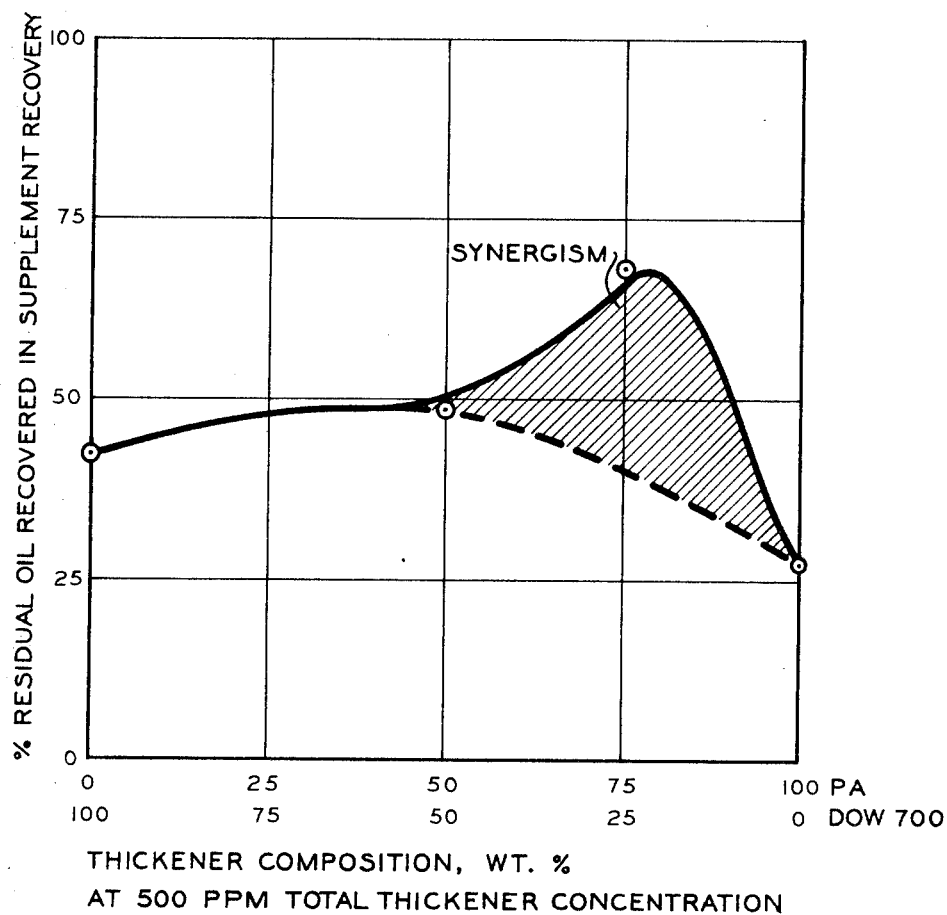
FIG. 2 compares the supplemented oil recoveries obtained at various compositions of thickener, all used at 500 ppm concentration. The magnitude of the synergism attained with up to 50 percent Dow 700 with unhydrolyzed polyacrylamide (PA) is indicated by the shaded area between the two curves.
Figure 3:
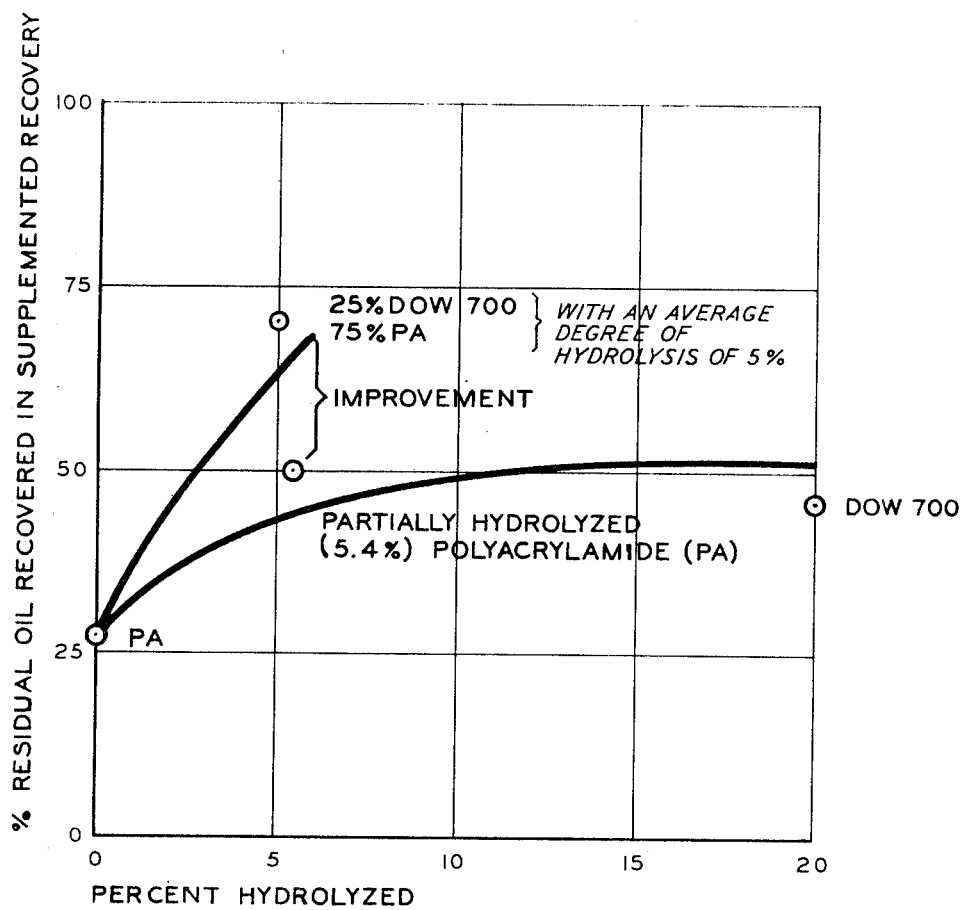
FIG. 3 compares the supplemented oil recoveries obtained with unhydrolyzed polyacrylamide (PA), partially hydrolyzed Dow 700 (20 percent hydrolyzed), another sample of 5.42 percent hydrolyzed polyacrylamide, and a blend of 75 percent PA and 25 Dow 700 with an average degree hydrolysis of about 5 percent. The improved results obtained with the blend of hydrolyzed and unhydrolyzed polyacrylamides indicate better supplemented oil recoveries when the two distinct type of polymers are present rather than one polymer with the same average degree of hydrolysis.

Examples 4, 5, and 6 show the unexpected synergistic improvement that one obtains with a thickener formulation comprised of 50 percent unhydrolyzed polyacrylamide and 50 percent Dow 700. These results are unexpected in light of the art taught in prior patents. These results are plotted on FIG. 1.

Examples 7, 8, and 9 were carried out to obtain additional data on the synergistic behavior of the mixed thickener system.

TABLE I

[Summary of thickened water supplemented recoveries [1]]

| Ex. No. | Run number | PV cc. | Porosity | Permeability, md. | $O_i$ | $W_i$ | $O_r$ | $W_r$ | Percent eff. | Thickener | PV | Percent of $O_r$ |
|---|---|---|---|---|---|---|---|---|---|---|---|---|
| 1 | 10020 | 1,056 | 0.205 | 356.8 | 0.610 | 0.390 | 0.345 | 0.655 | 43.4 | 500 p.p.m. Dow 700 | 0.925 | 46.1 |
| 2 | 02117 | 1,034 | 0.201 | 357.9 | 0.609 | 0.391 | 0.351 | 0.649 | 42.4 | 500 p.p.m. Dow 700 | 0.928 | 45.8 |
| 3 | 02118 | 1,008 | 0.198 | 351.5 | 0.641 | 0.359 | 0.368 | 0.632 | 42.6 | 700 p.p.m. Dow 700 | 0.996 | 52.3 |
| 4 | 03111 | 1,017 | 0.197 | 336.1 | 0.574 | 0.426 | 0.361 | 0.639 | 37.1 | 300 p.p.m. 50:50 PA/Dow 700 | 0.937 | 43.9 |
| 5 | 03112 | 1,034 | 0.201 | 388.4 | 0.584 | 0.416 | 0.370 | 0.630 | 36.7 | 500 p.p.m. 50:50 PA/Dow 700 | 0.926 | 48.1 |
| 6 | 03113 | 1,040 | 0.202 | 386.2 | 0.581 | 0.419 | 0.367 | 0.633 | 36.8 | 700 p.p.m. 50:50 PA/Dow 700 | 0.921 | 56.4 |
| 7 | 11016 | 1,071 | 0.208 | 410.6 | 0.613 | 0.387 | 0.365 | 0.635 | 40.5 | 500 p.p.m. PA | 1.052 | 27.7 |
| 8 | 12010 | 1,031 | 0.200 | 359.9 | 0.519 | 0.481 | 0.265 | 0.735 | 49.0 | 500 p.p.m. PHPA (5.42% hydrolyzed) | 0.662 | 47.2 |
| 9 | 12009 | 1,054 | 0.205 | 440.8 | 0.524 | 0.475 | 0.265 | 0.735 | 49.5 | 500 p.p.m. 25% Dow 700, 75% PA | [2] 0.85– (0.662) | [2] 68.5– (59.2) |

[1] 3 in. diameter by 4 ft. long Berea sandstone (fired at 825° F.) was first saturated with Henry plant brine (containing 11,000 p.p.m. Cl⁻, 6,500 p.p.m. Na⁺, 276 p.p.m. Ca⁺⁺, 167 p.p.m. Mg⁺⁺) and Henry Crude to an initial oil saturation ($O_i$) and initial water saturation ($W_i$); the core was subsequently flooded to residual saturation ($O_r$ and $W_r$) and then flood at rates of 1.9 to 3.7 ft./day with [0.03 PV of FF-516 slug (petroleum sulfonate slug) followed by] up to 1 pore volume of synthetic "Palestine Water" (containing 400 p.p.m. NaCl and 55 p.p.m. CaCl₂) and the addition crude recovered and calculated of percent of residual oil in the core before this final flood.

[2] Interpolated from data for comparison.

Modifications

It will be understood by those skilled in the art that the relative proportions of the admixture of unhydrolyzed polyacrylamide and partially hydrolyzed polyacrylamides utilized in the examples herein are merely exemplary of the relative proportions which may be employed with the present invention. For example, using nearly 100% partially hydrolyzed polyacrylamides at the leading edge of the displacement slug and gradually using a higher and higher percentage of unhydrolyzed polyacrylamide to provide a slug which is rich in the depletable component, unhydrolyzed polyacrylamide at its leading edge where depletion is most likely to occur. Initial viscosity of the slug may be the same at all points throughout the slug or may be itself gradually decreased until it approaches that of the drive fluid which displaces the slug through the formation.

What is claimed is:

1. A process for the displacement of oil in an oil bearing formation comprising injecting into said formation an aqueous solution comprised of about 0.001 to about 10 percent by weight of a water-soluble partially hydrolyzed polyacrylamide and about 0.001 to about 10 weight percent water soluble unhydrolyzed polyacrylamide based on the total solution.

2. Processes according to claim 1 wherein the partially hydrolyzed polyacrylamide polymer has a molecular weight above 100,000 prior to comixing with said unhydrolyzed polyacrylamide polymer.

3. Processes according to claim 1 wherein the partially hydrolyzed polyacrylamide has a molecular weight of from about 1,000,000 to about 10,000,000 and is hydrolyzed to from about 0.1 to about 70 percent of theory.

4. Process according to claim 1 wherein the aqueous solution is characterized by a viscosity of from about 1.5 to about 1,000 centipoises.

5. Process according to claim 4 wherein the aqueous solution is characterized by a viscosity of from about 5 to about 500 centipoises.

6. Process according to claim 4 wherein the aqueous solution is characterized by a viscosity of from about 10 to about 100 centiposes.

* * * * *